(12) United States Patent
Lee et al.

(10) Patent No.: US 10,821,421 B2
(45) Date of Patent: Nov. 3, 2020

(54) CATALYST, CATALYST COMPOSITION CONTAINING PT—NI ALLOY AND METHODS FOR SYNTHESIZING OF HYDROGEN PEROXIDE USING THEM

(71) Applicant: Korea Institute of Science and Technology, Seoul (KR)

(72) Inventors: Seung Yong Lee, Seoul (KR); Sang Soo Han, Seoul (KR); Hyo Bin Nam, Seoul (KR); Byung Chul Yeo, Seoul (KR); So Hye Cho, Seoul (KR); Ho Seong Jang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/215,521

(22) Filed: Dec. 10, 2018

(65) Prior Publication Data

US 2019/0176133 A1    Jun. 13, 2019

(30) Foreign Application Priority Data

Dec. 11, 2017    (KR) ........................ 10-2017-0169766

(51) Int. Cl.

| | | |
|---|---|---|
| *B01J 23/89* | (2006.01) | |
| *C01B 15/029* | (2006.01) | |
| *B01J 35/00* | (2006.01) | |
| *B01J 35/02* | (2006.01) | |
| *B01J 37/16* | (2006.01) | |

(52) U.S. Cl.
CPC .......... *B01J 23/892* (2013.01); *B01J 35/002* (2013.01); *B01J 35/0013* (2013.01); *B01J 35/02* (2013.01); *C01B 15/029* (2013.01); *B01J 37/16* (2013.01)

(58) Field of Classification Search
None
See application file for complete search history.

(56) References Cited

U.S. PATENT DOCUMENTS

| | | | | | |
|---|---|---|---|---|---|
| 4,970,128 | A | * | 11/1990 | Itoh ...................... | B01J 23/8926 |
| | | | | | 429/498 |
| 5,024,905 | A | * | 6/1991 | Itoh ........................ | H01M 4/90 |
| | | | | | 429/499 |

(Continued)

FOREIGN PATENT DOCUMENTS

WO    2015022548 A1    2/2015

OTHER PUBLICATIONS

Wakabayasi, Noriaki et al.; "Temperature dependence of oxygen reduction activity at Pt—Fe, Pt—Co, and Pt—Ni alloy electrodes." The Journal of Physical Chemistry B 109.12 (2005): 5836-5841.

(Continued)

*Primary Examiner* — Melissa S Swain
(74) *Attorney, Agent, or Firm* — Husch Blackwell LLP

(57) ABSTRACT

A catalyst and a catalyst composition, a method for preparing thereof, and a method for synthesizing of hydrogen peroxide using them are provided. The catalyst and the catalyst composition contains: an alloy of two elements, wherein the elements are Pt (Platinum) and Ni (Nickel). The present disclosure enables (a) replacing a high-priced palladium (Pd) catalyst with a new catalyst, (b) providing a high-active catalyst which catalyzes the direct synthesis reaction of the hydrogen peroxide.

6 Claims, 4 Drawing Sheets
(2 of 4 Drawing Sheet(s) Filed in Color)

CRYSTAL STRUCTURE OF PT-NI ALLOY :
FACE CENTERED TETRAGONAL (L1$_0$)

(56) References Cited

U.S. PATENT DOCUMENTS

| | | | | |
|---|---|---|---|---|
| 5,141,604 | A * | 8/1992 | Ayers | B01J 4/04 204/252 |
| 5,178,971 | A * | 1/1993 | Itoh | B01J 23/8926 429/498 |
| 7,442,360 | B2 * | 10/2008 | Tonkovich | B01J 19/0093 423/584 |
| 2008/0181842 | A1 * | 7/2008 | Sethi | B01J 19/0093 423/588 |
| 2009/0011293 | A1 * | 1/2009 | Wood | B01J 23/52 429/479 |
| 2010/0273091 | A1 * | 10/2010 | Brey | B01J 21/063 429/513 |
| 2014/0097387 | A1 | 4/2014 | Biausque et al. | |
| 2014/0378299 | A1 * | 12/2014 | Barrett | B01J 21/063 502/330 |
| 2017/0065968 | A1 * | 3/2017 | Desmedt | B01J 21/08 |

OTHER PUBLICATIONS

Singh, Sanjay K., Xu, Qiang; "Bimetallic Ni—Pt nanocatalysts for selective decomposition of hydrazine in aqueous solution to hydrogen at room temperature for chemical hydrogen storage." Inorganic chemistry 49.13 (2010): 6148-6152.

Mathe, Ntombizodwa R., Scriba, Manfred R., and Coville, Neil J., "Methanol oxidation reaction activity of microwave-irradiated and heat-treated Pt/Co and Pt/Ni nano-electrocatalysts." International journal of hydrogen energy 39.33 (2014): 18871-18881.

Ye, Linsen, et al. "Preparation and characterization of hydrophobic carbon-supported Pt3M (M= Fe, Co, Ni and Cr) bimetals for H/D isotope separation between hydrogen and water." International journal of hydrogen energy 39.25 (2014): 13793-13799.

Hu, Yaojuan, et al. "Effects of structure, composition, and carbon support properties on the electrocatalytic activity of Pt—Ni-graphene nanocatalysts for the methanol oxidation." Applied Catalysis B: Environmental 111 (2012): 208-217.

Zheng, Yeu, et al. "Three-dimensional PtxNi1-x nanoclusters supported on multiwalled carbon nanotubes in enzyme-free glucose biofuel cells." Journal of Power Sources 296 (2015): 30-39.

Zheng, Zhaoke, et al. "Epitaxial growth of Au—Pt—Ni nanorods for direct high selectivity H2O2 production." Advanced Materials 28.45 (2016): 9949-9955.

* cited by examiner

CRYSTAL STRUCTURE OF PT-NI ALLOY :
FACE CENTERED TETRAGONAL (L1$_0$)

FIG. 3

| CATALYSTS | | REACTION TIME | | ATOMIC RATIOS | |
|---|---|---|---|---|---|
| | | 30MIN | 60MIN | Pt | Ni |
| COMPARATIVE EXAMPLE | $Ni_{100}$ | 0.5-2 PPM | 0.5-2 PPM | – | 100 |
| EXAMPLE EMBODIMENTS | $Pt_1Ni_{99}$ | 5-10 PPM | 5-10 PPM | 3 | 97 |
| | $Pt_3Ni_{97}$ | 5-10 PPM | 10 PPM | 5 | 95 |
| | $Pt_6Ni_{94}$ | 10-25 PPM | 25 PPM | 10 | 90 |
| | $Pt_{33}Ni_{67}$ | 10-25 PPM | 10-25 PPM | 30 | 70 |
| | $Pt_{45}Ni_{55}$ | 10-25 PPM | 10-25 PPM | 50 | 50 |
| | $Pt_{64}Ni_{36}$ | 10-25 PPM | 10-25 PPM | 70 | 30 |
| | $Pt_{83}Ni_{17}$ | 10-25 PPM | 25 PPM | 90 | 10 |
| COMPARATIVE EXAMPLES | $Pt_{100}$ | 5-10 PPM | 10 PPM | 100 | – |
| | $Pd_{100}$ | 25 PPM | 25 PPM ↑ | – | – |

CATALYST, CATALYST COMPOSITION CONTAINING PT—NI ALLOY AND METHODS FOR SYNTHESIZING OF HYDROGEN PEROXIDE USING THEM

CROSS REFERENCE TO RELATED APPLICATION

This application claims priority to and incorporates herein by reference all disclosure in Korean patent application no. 10-2017-0169766 filed Dec. 11, 2017.

FIELD OF DISCLOSURE

The present disclosure relates to a catalyst and a catalyst composition; and more particularly, to the catalyst and the catalyst composition containing: an alloy of two elements, wherein the elements are Pt (Platinum) and Ni (Nickel); and methods for synthesizing of hydrogen peroxide using the alloy of the two elements. For reference, a government research and development project on future materials is being carried out by the applicant, Korea Institute of Science and Technology (KIST), from Feb. 1, 2018 to Jan. 31, 2019. Herein, a subject of the government research and development project on future materials is quantum alchemy catalyst development.

BACKGROUND OF THE DISCLOSURE

In various industries such as pulp and paper manufacturing, fiber, water treatment, compounds manufacturing, petrochemistry and semiconductors, etc., hydrogen peroxide (H2O2) is used as polish, disinfectants, oxidants, and fuels, etc. The production of the hydrogen peroxide is increasing every year, and according to Transparency Market Research, the global market size of the hydrogen peroxide is expected to reach approximately six billion dollars by 2023. A formula for direct synthesis reaction of the hydrogen peroxide from hydrogen and oxygen may be simple, however, a commercialization process has not been developed because the reaction is difficult to achieve. The global market size is expected to grow gradually through replacing the conventional inefficient synthesizing process of the hydrogen peroxide with an eco-friendly thereof.

Meanwhile, noble metals such as a Palladium (Pd) are being widely used to catalyze the direct synthesis reaction of the hydrogen peroxide. Herein, the Pd catalyst exhibits high activity on the synthesis reaction. However, such noble metals have a high cost of production. Accordingly, it is required to develop a new catalyst based on low-priced elements to meet the demand of the rapidly growing global market of the hydrogen peroxide.

SUMMARY OF THE DISCLOSURE

It is an object of the present disclosure to solve all the aforementioned problems.

It is another object of the present disclosure to replace a high-priced Palladium (Pd) catalyst with a new catalyst.

It is still another object of the present disclosure to provide a high-active catalyst which catalyzes direct synthesis reaction of hydrogen peroxide.

In accordance with one aspect of the present disclosure, there is provided a catalyst, containing: an alloy of two elements, wherein the elements are Pt (Platinum) and Ni (Nickel).

As one example, the alloy forms solid solution.

As one example, the alloy has a face-centered tetragonal structure.

As one example, the alloy catalyzes direct synthesis reaction of hydrogen peroxide ($H_2O_2$).

As one example, a molecular formula of the alloy is represented as $Pt_X Ni_{(100-X)}$, and wherein the X satisfies no less than 1 and no more than 83.

As one example, a molecular formula of the alloy is represented as $Pt_X Ni_{(100-X)}$, and wherein the X satisfies no less than 6 and no more than 83.

As one example, the Pt—Ni catalyst has 40% or more of a degree of activity of Pd100 catalyst in the course of direct synthesis reaction of hydrogen peroxide.

As one example, a structure of the Pt—Ni catalyst is similar to that of a Palladium (Pd) catalyst.

As one example, an electronic structure of the Pt—Ni catalyst is similar to that of a Palladium (Pd) catalyst in that DOS (Electron Density of State) values of the Pt—Ni catalyst are similar to those of the Pd catalyst.

In accordance with another aspect of the present disclosure, there is provided a catalyst composition, containing: an alloy of two elements, wherein the elements are Pt (Platinum) and Ni (Nickel).

As one example, the alloy forms solid solution.

As one example, the alloy has a face-centered tetragonal structure.

As one example, the alloy catalyzes direct synthesis reaction of hydrogen peroxide ($H_2O_2$).

As one example, a molecular formula of the alloy is represented as $Pt_X Ni_{(100-X)}$, and wherein the X satisfies no less than 6 and no more than 83.

As one example, an electronic structure of the Pt—Ni catalyst is similar to that of a Palladium (Pd) catalyst in that DOS (Electron Density of State) values of the Pt—Ni catalyst are similar to those of the Pd catalyst.

In accordance with still another aspect of the present disclosure, there is provided a method for synthesizing hydrogen peroxide, wherein the hydrogen peroxide is synthesized by using Pt—Ni catalyst or Pt—Ni catalyst composition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings attached below are to explain example embodiments of the present disclosure and are only part of preferred embodiments of the present disclosure. Other drawings may be obtained based on the drawings herein without inventive work for those skilled in the art. The above and other objects and features of the present disclosure will become apparent from the following description of preferred embodiments given in conjunction with the accompanying drawings, in which:

FIG. 3 is a table to illustrate respective amounts of synthesized hydrogen peroxide per each of ratios of Pt and Ni in Pt—Ni catalyst in accordance with one example embodiment of the present disclosure.

DETAILED DESCRIPTION OF THE PREFERRED EMBODIMENTS

Figure 1:
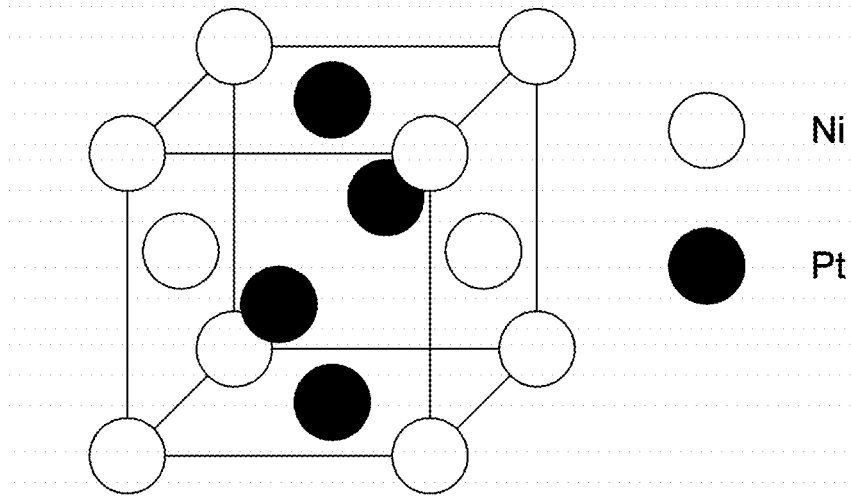
FIG. 1 is an exemplary diagram to illustrate a crystal structure of Pt—Ni alloy.

To make purposes, technical solutions, and advantages of the present disclosure clear, reference is made to the accompanying drawings that show, by way of illustration, more detailed example embodiments in which the disclosure may be practiced. These preferred embodiments are described in sufficient detail to enable those skilled in the art to practice the disclosure.

It is to be appreciated that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be appreciated that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Hereinafter, preferred embodiments of the present disclosure will be described in detail with reference to the accompanying drawings so that those skilled in the art may easily implement the present disclosure.

FIG. 1 is an exemplary diagram to illustrate a crystal structure of Pt—Ni alloy.

Referring to FIG. 1, a catalyst may contain an alloy of two elements. Herein, the elements are Pt (Platinum) and Ni (Nickel). In detail, the Pt—Ni alloy may form solid solution where particles of the Pt and particles of the Ni are uniformly distributed.

Also, the Pt—Ni alloy in accordance with the present disclosure may have a face-centered tetragonal structure (L10), but it is not limited thereto.

Herein, FIG. 1 illustrates one of various example embodiments of the present disclosure, however, the respective number of Pt atoms and Ni atoms per unit cell is not limited to FIG. 1. The Pt—Ni catalyst in accordance with the present disclosure may be composed of various atomic ratios (Pt:Ni). Detailed explanation on the atomic ratios will be made in the following by referring to FIG. 3.

Meanwhile, preparation of the Pt—Ni catalyst in accordance with one example embodiments of the present disclosure may include steps of: (a) obtaining a warm solution by dissolving 0.17 mmol of $H_2[PtCl_6]_x H_2O$, 0.17 mmol of $Ni(acac)_2$, and 2 mL of oleylamine into 10 mL of dioctyl ether at a temperature of 50° C.; (b) obtaining dark brown colloids by preparing a butyllithium solution containing 15 mL of the dioctyl ether and 1.2 mL of 2.0M butyllithium in cyclohexane and by injecting the warm solution into the butyllithium solution via a syringe at room temperatures; (c) stirring the dark brown colloids for 20 minutes, heating the colloids up to 120° C. for 1.5 hours in Ar atmosphere, and then heating the colloids up to 260° C. for an hour; (d) cooling down the colloids to room temperatures, injecting 1.25 mL of trioctylphosphine into the colloids for protection and then washing nanoparticles of an obtained catalyst three times with ethanol.

Herein, at the step of (a), the atomic ratios(Pt:Ni) determined by the amounts of two elements may be various from 3:97 to 90:10.

Meanwhile, the Pt—Ni catalyst in accordance with the present disclosure catalyzes direct synthesis reaction of hydrogen peroxide ($H_2O_2$). A formula for the direct synthesis reaction of the hydrogen peroxide using hydrogen and oxygen may be simple, however, a commercialization process has not been developed because the reaction is difficult to achieve. To catalyze the direct synthesis reaction of the hydrogen peroxide, noble metals such as a palladium (Pd) are being widely used as a catalyst. A Pd catalyst exhibits high activity on the synthesis reaction, however, such a metal has shortcomings due to a high cost of production.

The Pt—Ni catalyst may replace the Pd catalyst. It is confirmed that the Pt—Ni catalyst in accordance with the present disclosure and the Pd catalyst according to a comparative example of the conventional technology have similar electronic structures. Detailed explanation on the similarity will be made below by referring to FIG. 2.

(The Example Embodiments)

Figure 2:
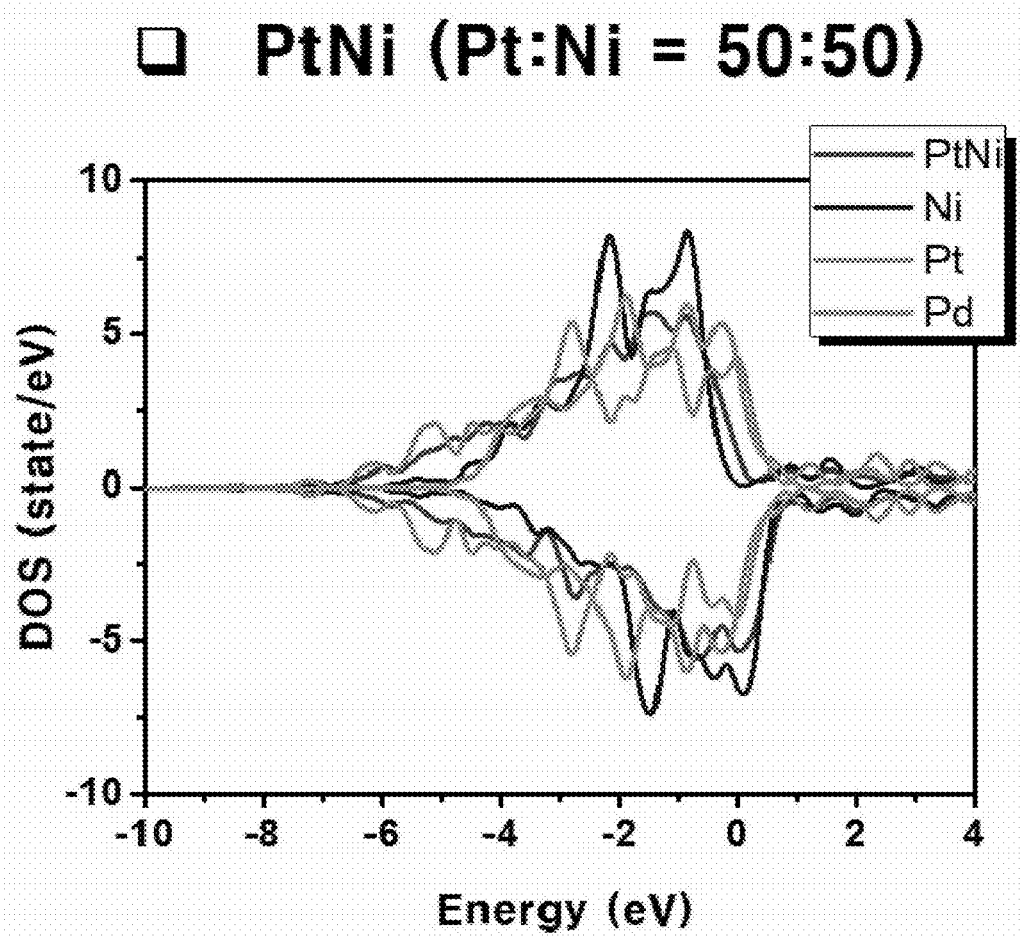
FIG. 2 is an exemplary diagram to illustrate a DOS (Electron Density of State) result of the Pt—Ni alloy in accordance with the present disclosure and that of Pd according to a comparative example of the conventional technology.

FIG. 2 is an exemplary diagram to illustrate a DOS (Electron Density of State) result of the Pt—Ni alloy in accordance with one example embodiment of the present disclosure and that of the Pd according to a comparative example of the conventional technology.

In a formula below, $\Delta DOS_{X-Y}$ is a value obtained by comparing respective DOS values of X and Y, with each other. Herein, the X and the Y may respectively be a substance or a composition, etc. The nearer the $\Delta DOS_{X-Y}$ reaches to 0, the more similar the respective DOS values of the X and the Y become with each other. If the X and the Y have similar electronic structures at a specific energy state, similar chemical characteristics can be exhibited as well. Specifically, if a substance, or a composition, etc. is determined as having a similar electronic structure to the Pd by referring to a $\Delta DOS$ value near 0, it is expected that a catalyst containing the substance or the composition, etc. may have similar catalyst characteristics with the Pd catalyst.

$$\Delta DOS_{X-Y} = \{[DOS_X(E) - DOS_Y(E)]^2 g(E; \sigma)dE\}^{1/2}$$

$$g(E; \sigma) = \frac{1}{\sigma\sqrt{X\pi}} e^{-(E-E_F)^2/2\sigma^2}$$

In FIG. 2, respective DOS values of the Ni, the Pt, and the Pd are illustrated as comparative examples to emphasize the similarity of DOS values of the Pt—Ni alloy (Pt:Ni=50:50) to those of the Pd. Herein, the DOS values of the Pt—Ni alloy exhibits more similarities with the DOS values of the Pd compared to the respective DOS values of the Ni and the Pt.

Further, a $\Delta DOS_{Pd-PtNi}$ shows 1.16, which is closer to 0 compared to a $\Delta DOS_{Pd-Ni}$ showing 1.25 and $\Delta DOS_{Pd-Pt}$ showing 1.84. That is, the Pt—Ni alloy has more similar DOS values with the Pd than the Ni and the Pt.

Through these results, it is confirmed that the Pt—Ni catalyst in accordance with the present disclosure has a similar electronic structure and similar catalyst characteristics with the Pd catalyst.

Meanwhile, detailed explanation on respective amounts of synthesized hydrogen peroxide per each of ratios of the Pt and the Ni in the Pt—Ni catalyst will be made in the following by referring to FIG. 3.

Herein, preparing the Pt—Ni catalyst with the respective atomic ratios to assess the activity of the respective atomic ratios may be carried out without the heat treatment or the washing process, but it is not limited thereto. Also, the Pt—Ni catalyst with the respective atomic ratios may be prepared in a liquid state or a powder state, but it is not limited thereto.

(Example of Assessment)

An experiment on the direct synthesis reaction of the hydrogen peroxide to confirm the catalyst characteristics of the Pt—Ni catalyst was conducted per each of the atomic ratios.

More specifically, in the experiment, the hydrogen peroxide was synthesized by using 0.0015 mmol nanoparticles of the Pt—Ni catalyst, 2 mL solution containing deionize water-ethanol (20%), 0.02M phosphoric acid ($H_3PO_4$), and 0.9 mM NaBr. Herein, gas flow in the synthesis process was 70 mL/min(4% $H_2$ in Ar 50 mL/min, $O_2$ 20 mL/min; $H_2:O_2=10:1$).

Herein, the direct synthesis reaction of the hydrogen peroxide was conducted for 30 and 60 minutes, by using the Pt—Ni catalyst with the respective atomic ratios. Strips which change their colors depending on the amounts of the hydrogen peroxide were used for measuring the amounts of the hydrogen peroxide per each of the atomic ratios. The respective results of the amounts of the synthesized hydrogen peroxide are illustrated in FIG. 3.

The activities of $Pt_1Ni_{99}$, $Pt_3Ni_{97}$, $Pt_6Ni_{94}$, $Pt_{33}Ni_{67}$, $Pt_{45}Ni_{55}$, $Pt_{64}Ni_{36}$, and $Pt_{83}Ni_{17}$ were measured as the example embodiments, and the activities of $Ni_{100}$, $Pt_{100}$, and $Pd_{100}$ were measured as the comparative examples.

Compared to results that the amounts of the synthesized hydrogen peroxide with the Ni100 catalyst were respectively 0.5~2 ppm after 30 and 60 minutes of reaction time, the activities per each of the atomic ratios of the Pt—Ni catalyst ($Pt_xNi_{(100-x)}$) in accordance with the example embodiments of the present disclosure surpassed the activities of the $Ni_{100}$ when the X satisfied values same as or larger than 1. Further, the activities of the Pt—Ni catalyst ($Pt_xNi_{(100-x)}$) surpassed the activities of the Pt100 even when the X satisfied 83. That is, it was confirmed that the Pt—Ni catalyst ($Pt_xNi_{(100-x)}$) exhibits high activities when the X satisfies no less than 1 and no more than 83.

Also, the amounts of the synthesized hydrogen peroxide with the $Pd_{100}$ were 25 ppm after 30 minutes of the reaction time and same as or larger than 25 ppm after 60 minutes of the reaction time. Further, the amounts of the synthesized hydrogen peroxide with the $Pt_{100}$ were 5-10 ppm after 30 minutes of the reaction time and 10 ppm after 60 minutes of the reaction time. Compared to these results, it was confirmed that the Pt—Ni catalyst ($Pt_xNi_{(100-x)}$) exhibits high activity as 40%~100% of a degree of activity of the Pd100, when the X satisfies no less than 6 and no more than 83.

Particularly, it was confirmed that the Pt—Ni catalyst ($Pt_xNi_{(100-x)}$) exhibits distinctly high activity as almost 100% of a degree of the activity of the $Pd_{100}$ when the X satisfies 6. That is, it was confirmed that the $Pt_6Ni_{94}$, which has large amount of the Ni, exhibits the highest activity among the example embodiments. This result indicates that the Pt—Ni catalyst may provide a wide selection range of the hydrogen peroxide in that the Ni has a lower price than the Pt.

Further, the Pt—Ni catalyst ($Pt_xNi_{(100-x)}$) is a low-priced and high-active catalyst when the X satisfies no less than 3 and no more than 64 in that the Ni also has a lower price than the Pd, and that the Pt—Ni catalyst exhibits higher activities than the Pt100 and similar activities with the $Pd_{100}$.

Through the results explained above, it was confirmed that the Pt—Ni catalyst in accordance with the present disclosure catalyzes the direct synthesis reaction of the hydrogen peroxide. Further, it was also confirmed that the Pt—Ni catalyst in accordance with the present disclosure has a competitive price and the high activity, which enables replacement of the conventional Pd catalyst.

Meanwhile, a Pt—Ni catalyst composition is provided as another example embodiment of the present disclosure. The explanation on the catalyst characteristics of the Pt—Ni catalyst and the activities per each of the atomic ratios thereof will be omitted not to make a repetition.

Herein, the Pt—Ni catalyst composition including the Pt—Ni alloy may be carried in a certain catalyst support. Also, the Pt—Ni catalyst composition may further include a certain substance for catalyzing the direct synthesis reaction of the hydrogen peroxide.

Also, a method for synthesizing the hydrogen peroxide by using the Pt—Ni catalyst or the Pt—Ni catalyst composition may be provided as still another example embodiment.

The method for synthesizing the hydrogen peroxide of the present disclosure using the Pt—Ni catalyst may replace a conventional method using the Pd catalyst owing to its competitive price. Also, it is expected to meet the demand of the global market of the hydrogen peroxide by replacing the conventional inefficient synthesizing process of the hydrogen peroxide with an eco-friendly process thereof.

Next, detailed explanation on analysis on HAADF (High-angle Annular Dark Field)-STEM (Scanning Transmission Electron Microscope) images of the Pt—Ni alloy generated while varying a ratio of the Pt and the Ni in accordance with one example embodiments will be made below by referring to FIG. 4.

Figure 4:
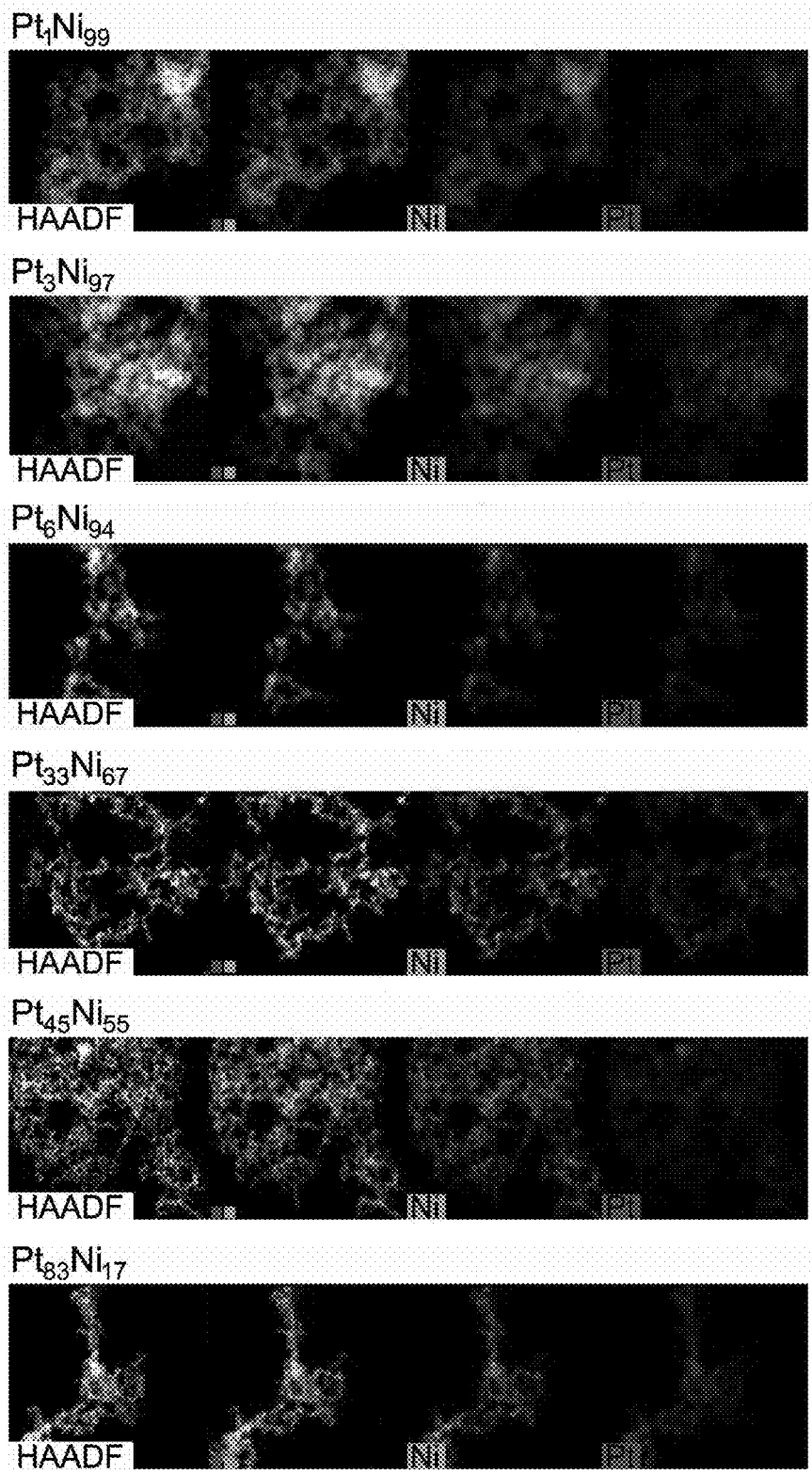
FIG. 4 includes HAADF (High-angle Annular Dark Field)-STEM (Scanning Transmission Electron Microscope) images of the Pt—Ni alloy generated while varying a ratio of the Pt and the Ni in accordance with one example embodiment of the present disclosure.

FIG. 4 includes the HAADF-STEM images of the Pt—Ni alloy in accordance with example embodiments of the present disclosure. By analyzing the images for each of the atomic ratios of the Pt—Ni alloy, FIG. 4 exhibits the catalyst characteristics of the Pt—Ni catalyst.

In FIG. 4, the HAADF-STEM images shown in White may be illustrated as original images for each of the atomic ratios of the Pt—Ni alloy. Herein, the HAADF-STEM images were obtained by Talos F200X manufactured by FEI Company at an accelerating voltage of 200 kV.

Further, mapping images, shown in Yellow, Green, and Red, generated from the HAADF-STEM images by using EDS (Energy Dispersive Spectrometer), may be illustrated. Specifically, the mapping images may include images of the Pt—Ni alloy in Yellow, those of the Ni in Green and those of the Pt in Red. Herein, the mapping images were obtained by Super-X EDS SYSTEM manufactured by Bruker Corporation at a measurement range of 0~40 kV.

By referring to the mapping images of the Pt—Ni alloy in Yellow, it is observed that the mapping images of the Ni in Green and those of the Pt in Red exhibit uniform distribution of the Ni and the Pt. That is, the Pt atoms and the Ni atoms are uniformly distributed in one or more particles of the Pt—Ni alloy, even if the atomic ratio of the Pt—Ni alloy changes from the $Pt_1Ni_{99}$ to the $Pt_{83}Ni_{17}$.

In accordance with the present disclosure, there is an effect of replacing the high-priced palladium (Pd) catalyst with a new catalyst.

In accordance with the present disclosure, there is another effect of providing a high-active catalyst which catalyzes the direct synthesis reaction of hydrogen peroxide.

As seen above, the present disclosure has been specifically described by such matters as detailed components, limited embodiments, and drawings. While the disclosure has been shown and described with respect to the preferred embodiments, it, however, may be appreciated by those skilled in the art that various changes and modifications may be made without departing from the spirit and the scope of the present disclosure as defined in the following claims.

Accordingly, the thought of the present disclosure must not be confined to the explained preferred or example embodiments, and the following patent claims as well as everything including variations equal or equivalent to the patent claims pertain to the category of the thought of the present disclosure.

What is claimed is:

1. A catalyst for the direct synthesis of hydrogen peroxide, comprising:
    an alloy consisting of two elements, wherein the elements are Pt(Platinum) and Ni(Nickel),
    wherein the alloy has a face-centered tetragonal structure;
    the molecular formula of the alloy is represented as $Pt_XNi_{(100-X)}$, wherein X is no less than 6 and no more than 45;
    and the alloy catalyzes a direct synthesis reaction of hydrogen peroxide ($H_2O_2$).

2. The catalyst of claim 1, wherein the alloy forms solid solution.

3. A method for synthesizing hydrogen peroxide, wherein the hydrogen peroxide is synthesized by using the catalyst of claim 1.

4. A catalyst composition, comprising:
    an alloy consisting of two elements, wherein the elements are Pt(Platinum) and Ni(Nickel),
    wherein the alloy has a face-centered tetragonal structure;
    the molecular formula of the alloy is represented as $Pt_XNi_{(100-X)}$, wherein X is no less than 6 and no more than 45;
    and the alloy catalyzes a direct synthesis reaction of hydrogen peroxide ($H_2O_2$).

5. The catalyst composition of claim 4, wherein the alloy forms solid solution.

6. A method for synthesizing hydrogen peroxide, wherein the hydrogen peroxide is synthesized by using the catalyst composition of claim 4.

* * * * *